United States Patent
North et al.

(10) Patent No.: US 9,714,837 B2
(45) Date of Patent: Jul. 25, 2017

(54) PRESENTING ROUTING INFORMATION FOR ELECTRIC VEHICLES

(71) Applicant: Recargo, Inc., Venice, CA (US)

(72) Inventors: Forrest North, Venice, CA (US); Lucas Manfield, Venice, CA (US); Armen Petrosian, Venice, CA (US); Nick Wild, Venice, CA (US)

(73) Assignee: ReCargo, Inc., Venice, CA (US)

( * ) Notice: Subject to any disclaimer, the term of this patent is extended or adjusted under 35 U.S.C. 154(b) by 0 days.

(21) Appl. No.: 14/616,255

(22) Filed: Feb. 6, 2015

(65) Prior Publication Data

US 2015/0226567 A1 Aug. 13, 2015

Related U.S. Application Data

(60) Provisional application No. 61/937,400, filed on Feb. 7, 2014.

(51) Int. Cl.
*G01C 21/00* (2006.01)
*G01C 21/34* (2006.01)
(Continued)

(52) U.S. Cl.
CPC ...... *G01C 21/3469* (2013.01); *B60L 11/1809* (2013.01); *B60L 11/1824* (2013.01); *B60L 11/1838* (2013.01); *B60L 11/1861* (2013.01); *G01C 21/3605* (2013.01); *G01C 21/367* (2013.01); *G01C 21/3682* (2013.01); *G01C 21/3691* (2013.01); *G01C 21/3697* (2013.01); *B60L 2230/40* (2013.01); *B60L 2240/622* (2013.01); *B60L 2240/70* (2013.01); *B60L 2250/12* (2013.01); *B60L 2250/16* (2013.01); *B60L 2260/52* (2013.01); *B60L 2260/54* (2013.01); *H02J 7/0047* (2013.01); *H02J 7/1461* (2013.01); *H02J 2007/005* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01);
(Continued)

(58) Field of Classification Search
CPC ..................................................... G08B 21/00
See application file for complete search history.

(56) References Cited

U.S. PATENT DOCUMENTS 7,671,567 B2 * 3/2010 Eberhard ............... H02J 7/045
320/150
8,054,038 B2 * 11/2011 Kelty .................... B60L 3/0046
320/109
(Continued)

*Primary Examiner* — Jonathan M Dager
(74) *Attorney, Agent, or Firm* — Perkins Coie LLP

(57) ABSTRACT

Systems and methods for identifying available charging stations (e.g., charging stations available to be used by an electric vehicle) and/or determining travel routes for electric vehicles are described. In some embodiments, the systems and methods receive a request to find an available charging station, determine a state of charge for an electric vehicle associated with the request, identifies one or more available charging stations located within a suitable distance to the electric vehicle, the suitable distance based on the determined state of the charge for the electric vehicle, and present information to the electric vehicle, or an associated mobile device, that indicates the identified charging stations.

16 Claims, 10 Drawing Sheets

(51) Int. Cl.
  *B60L 11/18* (2006.01)
  *G01C 21/36* (2006.01)
  *H02J 7/00* (2006.01)
  *H02J 7/14* (2006.01)

(52) U.S. Cl.
  CPC ............ *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y04S 30/12* (2013.01)

(56) References Cited

U.S. PATENT DOCUMENTS

| | | | |
|---|---|---|---|
| 8,457,821 B2 | 6/2013 | Shaffer | |
| 8,577,528 B2* | 11/2013 | Uyeki | B60L 11/1838 320/101 |
| 8,698,642 B2 | 4/2014 | Taguchi | |
| 8,907,629 B2* | 12/2014 | Kelty | B60L 11/187 320/132 |
| 8,989,954 B1* | 3/2015 | Addepalli | H04W 4/046 370/328 |
| 2008/0319597 A1* | 12/2008 | Yamada | B60K 6/46 701/22 |
| 2009/0021218 A1* | 1/2009 | Kelty | B60L 3/0092 320/137 |
| 2010/0094496 A1* | 4/2010 | Hershkovitz | B60L 3/12 701/22 |
| 2011/0032110 A1* | 2/2011 | Taguchi | B60L 3/12 340/636.1 |
| 2011/0153474 A1* | 6/2011 | Tormey | G06Q 20/40 705/31 |
| 2011/0191186 A1* | 8/2011 | Levy | G06F 3/048 705/14.58 |
| 2011/0193522 A1* | 8/2011 | Uesugi | B60L 1/003 320/109 |
| 2011/0224900 A1* | 9/2011 | Hiruta | G01C 21/3469 701/533 |
| 2011/0238457 A1 | 9/2011 | Mason et al. | |
| 2012/0109519 A1* | 5/2012 | Uyeki | B60L 7/14 701/439 |
| 2012/0158299 A1 | 6/2012 | Cerecke et al. | |
| 2012/0173061 A1* | 7/2012 | Hanley | B60L 11/1816 701/22 |
| 2012/0205187 A1 | 8/2012 | Izutani | |
| 2012/0233077 A1* | 9/2012 | Tate, Jr. | B60L 11/1816 705/65 |
| 2012/0271723 A1* | 10/2012 | Penilla | G06Q 20/18 705/16 |
| 2012/0306446 A1* | 12/2012 | Suganuma | B60L 11/1824 320/109 |
| 2013/0024306 A1 | 1/2013 | Shah et al. | |
| 2013/0030696 A1 | 1/2013 | Wu et al. | |
| 2013/0046457 A1 | 2/2013 | Pettersson | |
| 2013/0127416 A1* | 5/2013 | Karner | G06Q 20/102 320/109 |
| 2013/0179007 A1 | 7/2013 | Dalum | |
| 2013/0179057 A1* | 7/2013 | Fisher | B60L 11/1861 701/117 |
| 2013/0179061 A1* | 7/2013 | Gadh | B60L 11/1842 701/123 |
| 2013/0282472 A1* | 10/2013 | Penilla | B60S 5/06 705/14.35 |
| 2013/0307475 A1* | 11/2013 | Kishiyama | H02J 7/0027 320/109 |
| 2013/0339072 A1* | 12/2013 | Touge | G06Q 10/00 705/5 |
| 2014/0021908 A1* | 1/2014 | McCool | B60L 11/182 320/108 |
| 2014/0163877 A1* | 6/2014 | Kiyama | G01C 21/3469 701/533 |
| 2014/0188367 A1* | 7/2014 | North | G07C 5/008 701/101 |
| 2014/0225564 A1* | 8/2014 | North | B60L 11/1842 320/109 |
| 2014/0288832 A1* | 9/2014 | Hoch | B60L 3/12 701/538 |
| 2014/0347018 A1* | 11/2014 | Boblett | B60L 11/1838 320/162 |
| 2015/0045985 A1* | 2/2015 | Yenamandra | G01C 21/3679 701/1 |
| 2015/0095233 A1* | 4/2015 | Wild | B60L 11/1848 705/44 |
| 2015/0100226 A1* | 4/2015 | Skaff | B60W 40/12 701/123 |
| 2015/0198459 A1* | 7/2015 | MacNeille | G01C 21/3697 701/22 |
| 2015/0224888 A1* | 8/2015 | Wild | B60L 11/1824 705/26.9 |
| 2015/0224891 A1* | 8/2015 | Petrosian | B60L 11/1851 701/31.4 |
| 2015/0226566 A1* | 8/2015 | North | G01C 21/3469 701/428 |
| 2015/0226567 A1 | 8/2015 | North et al. | |
| 2015/0226572 A1* | 8/2015 | North | G01C 21/3469 701/400 |
| 2015/0239365 A1* | 8/2015 | Hyde | B60L 11/1861 701/2 |
| 2015/0241233 A1* | 8/2015 | Loftus | G01C 21/3682 701/410 |
| 2015/0306969 A1* | 10/2015 | Sabripour | B60L 11/1824 320/109 |
| 2015/0321570 A1* | 11/2015 | Cun | B60L 11/1803 705/34 |
| 2015/0343912 A1* | 12/2015 | McNally | B60L 11/1816 320/109 |
| 2016/0076899 A1* | 3/2016 | Macneille | G01C 21/3469 701/428 |

\* cited by examiner

PRESENTING ROUTING INFORMATION FOR ELECTRIC VEHICLES

CROSS-REFERENCE TO RELATED APPLICATIONS

This application claims priority to U.S. Provisional Patent Application No. 61/937,400, filed on Feb. 7, 2014, entitled PRESENTING ROUTING INFORMATION FOR ELECTRIC VEHICLES, which is hereby incorporated by reference in its entirety.

BACKGROUND

Although the adoption of electric vehicles is increasing, there are still many people that find them confusing or inaccessible, or are otherwise not interested in using electric vehicles for their transportation needs. Therefore, technology is being developed to remove such barriers associated with the adoption of electric vehicles.

DETAILED DESCRIPTION

Overview

Figure 1:
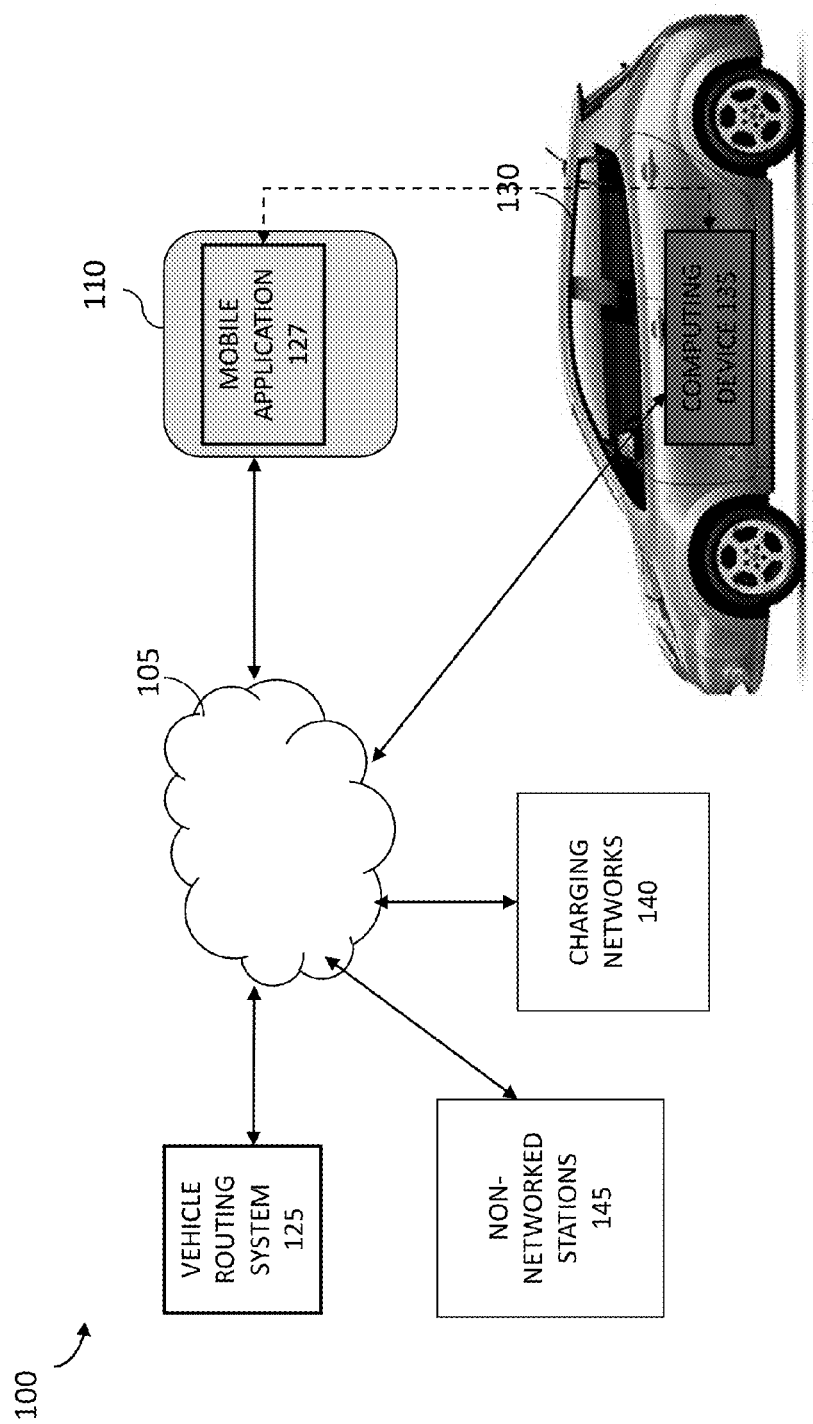
FIG. 1 is a block diagram illustrating components of a suitable computing environment.

Systems and methods for identifying available charging stations (e.g., charging stations available to be used by an electric vehicle) and/or determining travel routes for electric vehicles are described.

In some embodiments, the systems and methods receive a request to find an available charging station, determine a state of charge for an electric vehicle associated with the request, identifies one or more available charging stations located within a suitable distance to the electric vehicle, the suitable distance based on the determined state of the charge for the electric vehicle, and present information to the electric vehicle, or an associated mobile device, that indicates the identified charging stations.

For example, the systems and methods may display, via a displayed map provided by a mapping application of a mobile device associated with the electric vehicle, a graphical element indicating a range of travel available to the electric vehicle based on the determined state of charge for the electric vehicle and icons representative of the available charging stations located within the range of travel available to the electric vehicle.

In some embodiments, the systems and methods receive a request to find a charging station, access context information for a current trip traveled by an electric vehicle associated with the request, identify one or more charging stations that include characteristics matching the context information, and present information to the electric vehicle that indicates the identified one or more charging stations.

In some embodiments, the systems and methods receive a request to find an available charging station, identify one or more charging stations that satisfy parameters for a current trip of an electric vehicle that is associated with the request, and automatically select a charging station that is a best match for the electric vehicle. The systems and methods may then present information to the electric vehicle that indicates the selected charging station.

In some embodiments, the systems and methods receive a request to determine a route to a destination, determine a state of charge for an electric vehicle associated with the request, generate a route of travel to the destination based on the determined state of charge, and display the generated route via a mapping application associated with the electric vehicle.

For example, the systems and methods may generate a route of travel that includes at least one charging station at a geographical location that is at a driving distance within the determined possible driving distance when a driving distance between a current location of the electric vehicle and the destination is greater than the determined possible driving distance for the electric vehicle based on the determined state of charge.

The systems and various performed methods will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

As described herein, systems and methods for identifying charging stations and/or travel routes for electric vehicles are described. FIG. 1 illustrates components of a suitable computing environment 100 in which a vehicle routing system 125 may be supported and/or implemented. The computing environment 100 includes a mobile device 110, such as a mobile phone or tablet computer that supports and provides applications (e.g., "apps") to a user of the mobile device 110. For example, the mobile device 110 may include a mobile application 127 provided by and/or associated with the vehicle routing system 125. The mobile application 127 may communicate with other mobile applications (e.g., a mapping application) the vehicle routing system 125, one or more charging networks 140, one or more non-network charging stations (e.g., home charging stations) 145, and/or a computing device 135 supported by an electric vehicle 130, over a network 105, such as the internet or other wireless or telecommunication networks. The electric vehicle (EV) 130 may be a vehicle such as a plugin hybrid, range extended hybrid, electric traction or battery or plugin vehicle, and may connect to charging stations 145 or charging stations provided by one or more disparate charging networks 140 in order to charge batteries or other energy storage components of the EV.

The mobile device 110 may be a tablet computer, mobile device, smart-phone, net-book, mobile GPS navigation device, or any other device that supports, presents, and/or displays apps via a user interface, such as a touch-screen, of the device. The mobile device 110 includes various hardware and/or software components in order to provide such functionality. For example, the mobile device 110 includes various human interface components, device components, and memory, and so on.

The mobile device 110 may include a touch-screen or other input component that provides input to a processor. The touch-screen may include or communicate with a hardware controller, such as a touch-screen driver, that interprets raw signals received from the touch-screen and transmits information associated with a contact event (e.g., a pressing of an app via the touch-screen), to the processor. The touch-screen may be part of a display, such as a touch-screen display, a flat panel display, an electronic ink display, a head-mounted display, a liquid crystal display, a light-emitting diode display, a plasma panel display, an electroluminescent display, a vacuum fluorescent display, a digital projector, a laser projector, a heads-up display, and so on. The mobile device 110 may include other interface components, such as a speaker that provides appropriate auditory signals to assist a user in navigating a touch-screen, and so on.

The mobile device 110 may include various device components, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The mobile device 110 may include a processor that communicates with data or applications stored in memory of the device 110, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory may include various program components or modules, such as an operating system, and various applications, such as applications downloaded to the device 110. For example, the memory may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

The memory may store one or more applications associated with an electric vehicle, such as the mobile application 127, which facilitates communications between the mobile device 110 and an electric vehicle 130, the computing device 135 of the electric vehicle 130, the charging networks 140, the charging stations 145, and/or a server supporting the vehicle routing system 125.

For example, the mobile application 127 may communicate over the network 105 with the computing device 135 of the electric vehicle 130, the charging networks 140, the charging stations 145, and/or the vehicle routing system 125. The network 105 may be a Local Area Network (LAN), a Wide Area Network (WAN), the Internet, or other networks capable of facilitating various communications between computing devices.

In some embodiments, the mobile application 127 may communicate directly with various components of the computing environment 100. The mobile device 110 may include various communication components (e.g., Bluetooth) that facilitate short range, near field, and/or other direct or personal area network communications between devices. For example, the mobile application 127 may utilize Bluetooth communication to exchange data with the charging networks 140 and/or the charging stations 145 when other networks are unavailable or inaccessible (e.g., when the EV 130 is at charging stations 145 in an underground parking lot that does not receive sufficient wireless or telecommunication signals).

The computing device 135 of the electric vehicle 130 may include various computing components and/or modules configured and/or programmed to control, manage, diagnose, or otherwise interact with components of the electric vehicle 130. For example, the EV computing device 135 may include an on-board computing system that includes on-board diagnostics, such as components configured and/or programmed to detect and/or receive information from the electric vehicle's engine, battery pack, various sensors, dashboard controls, and so on. The components may detect, sense, and/or capture various types of information, such as outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on. For example, the components may detect, receive, and/or access motor controller information, such as information associated with the power, voltage, current, frequency, waveform, modulation, and/or regenerative power of the motor of the EV, as well as information from modules which control ancillary functions of the EV, such as information associated with operations of the lights, wipers, anti-lock brakes, seat warmers, music, climate controls, light sensors, smoke sensors, acceleration sensors, and other ancillary operations of an EV.

The computing device 135 may also include various direct communication components, such as radios or other data transmission devices (e.g., Bluetooth, Wi-Fi-, two-way, and so on) configured and/or programmed to transmit information from the EV computing device 135 to devices located remotely from the electric vehicle 130, such as the mobile device 110, the charging networks 140, the charging stations 145, and so on.

FIG. 1 and the discussion herein provide a brief, general description of a suitable computing environment in which the vehicle routing system 125 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of Identifying Available Charging Stations for an Electric Vehicle

As described herein, in some embodiments, the vehicle routing system 125 is configured to identifying suitable charging stations for an electric vehicle based on a state of charge of the electric vehicle and/or based on a determined availability (e.g., status) of the charging stations, among other things.

Figure 2:
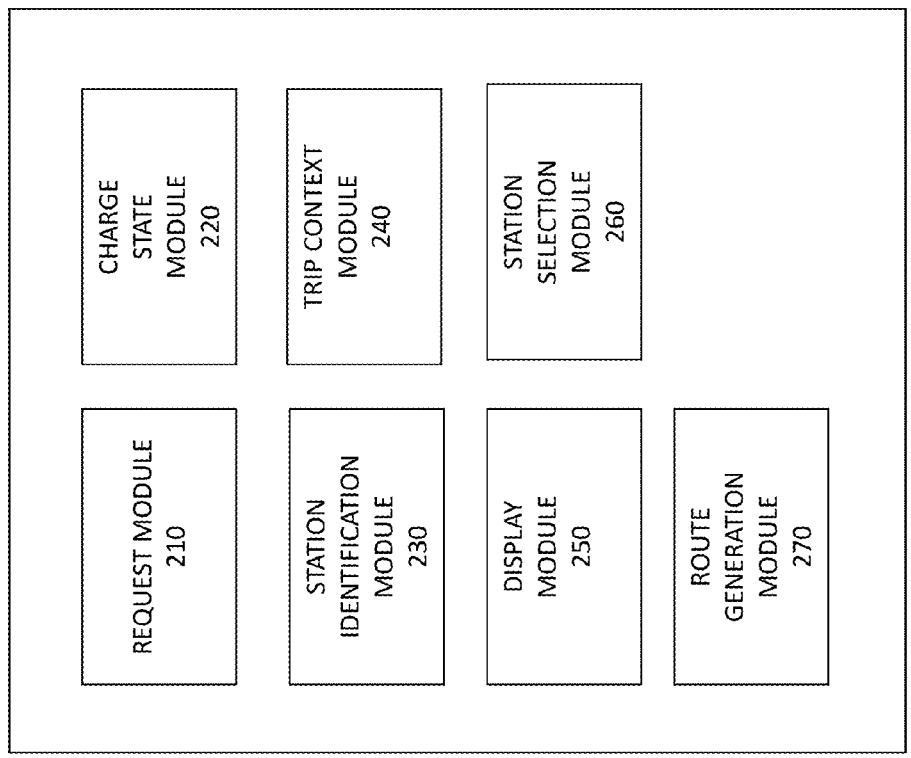
FIG. 2 is a block diagram illustrating components of a vehicle routing system.

FIG. 2 is a block diagram illustrating components of a vehicle routing system 200, such as a request module 210, a charge state module 220, a station identification module 230, a trip context module 240, a display module 250, a station selection module 260, and a route generation module 270.

As illustrated in FIG. 2, the vehicle routing system 125 includes a variety of functional modules. One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

In some embodiments, the request module 210 is configured and/or programmed to receive a request to find an available charging station. For example, the request module 210 may receive the request via input provided by a driver of the electric vehicle to the mobile application, may receive the request when the state of charge of the electric vehicle falls below a threshold state of charge, and so on.

In some embodiments, the charge state module 220 is configured and/or programmed to determine a state of charge for an electric vehicle associated with the request. For example, the charge state module 220 may query and/or access information stored by the computing device 135 in order to retrieve and/or access information indicating a state of charge of a battery pack of the electric vehicle 130.

In some embodiments, the station identification module 230 is configured and/or programmed to identify one or more available charging stations located within a suitable distance to the electric vehicle, where a suitable distance is based on the determined state of the charge for the electric vehicle (e.g., how far the electric vehicle can travel given a current state of charge). For example, the station identification module 230 may identify a charging station as available when the charging station is not currently reserved by another electric vehicle, when the charging station is not currently charging another electric vehicle, by determining a travel time associated with the electric vehicle traveling to one or more prospective charging stations, and selecting or identifying prospective charging stations that are predicted to be available to charge the electric vehicle after the determined travel time has lapsed, and so on.

In some embodiments, the station identification module 230 may determine a suitable distance to be a distance associated with an amount of energy the electric vehicle 130 is capable of using based on the state of charge of the electric vehicle. For example, the station identification module 230 may calculate or otherwise determine a value for the energy usage required for an electric vehicle to travel to a given charging station, and determine whether the charging station is an available charging station based on the determination.

The station identification module 230 may determine a value for the energy usage as a function of the distance of the route to be traveled, the altitude or elevation profile of the route, the traffic on the route, the current weather along the route, the make of the electric vehicle 130, the age of the electric vehicle 130, the degradation of the battery, and so on. For example, the station identification module 230 may determine, for a likely route traveled by the electric vehicle 130 to a charging station, a predicted energy usage in traveling the route.

In some cases, the station identification module 230 may access information indicating a historical energy usage for a given route or combination of routes, and use the accessed information when determining or predicting the energy usage for an electric vehicle 130 in traveling a route to a charging station. Therefore, the station identification module 230 may identify one or more charging stations that are on a route having an associated predicted energy usage that matches or is less than an amount of energy of the charge state of the battery of the electric vehicle 130.

In some embodiments, the trip context module 240 is configured and/or programmed to accesses context information for a current trip traveled by an electric vehicle associated with the request. For example, the trip context module 240 may access, retrieve, and/or receive context information provided by the computing device 135 of the electric vehicle 130 and/or provided by the mobile application 127, among other locations. The context information may include information associated with a current geographical route traveled by the electric vehicle, information associated with a geographical route predicted to be traveled by the electric vehicle, information indicating costs to charge at the one or more charging stations, information identifying charging networks providing the one or more charging stations, and so on.

In some embodiments, the display module 250 is configured and/or programmed to present information to the electric vehicle that indicates the identified charging stations. The display module 250 may display icons within a displayed map presented by a mapping application, the icons representative of the available charging stations, may present a list of information associated with the available charging stations, and so on. For example, the display module 250 may display, via a displayed map provided by a mapping application of a mobile device associated with the electric vehicle, a graphical element indicating a range of travel available to the electric vehicle based on the determined state of charge for the electric vehicle and icons representative of the available charging stations located within the range of travel available to the electric vehicle.

In some embodiments, the station selection module 260 is configured and/or programmed to automatically select a charging station that is a best match for the electric vehicle. For example, the station selection module 260 may compare some or all available or proximate charging stations to information associated with the parameters of a current trip traveled by the electric vehicle 130, and determine a best matched charging station to the parameters of the current trip.

As an example, the parameters of a current trip may be associated with a state of charge being at a certain low level of charge and a route currently traveled by the electric vehicle 130 to a destination. The station selection module 260 may identify and select a charging station that is within a travel range available to the electric vehicle 130 based on the low level of charge and is proximate to the route currently traveled by the electric vehicle to the destination.

The station selection module 260, may, in some embodiments, access information associated with other electric vehicles, and utilize the accessed information when selecting a charging station that is a best match for the electric vehicle 130. For example, the vehicle routing system 125 may receive information and/or determine routes a group of electric vehicles, and match each of the electric vehicles of the group to charging stations that satisfy parameters of their respective trips. Therefore, the station selection module 260 may determine a best matched charging station to be a charging station that matches parameters of the current trip of the electric vehicle 130 and that does not match parameters of other electric vehicles (e.g., is not needed to charge another electric vehicle).

In some embodiments, the route generation module 270 is configured and/or programmed to generate a route of travel to the destination based on the determined state of charge. For example, the route generation module 270 may determine a possible driving distance for the electric vehicle based on a determined state of charge, and generate a route of travel that includes at least one charging station at a geographical location that is at a driving distance within the determined possible driving distance when a driving distance between a current location of the electric vehicle and the destination is greater than the determined possible driving distance for the electric vehicle based on the determined state of charge. The route generation module 270 may access information from various mapping applications and/or geographical positioning components, such as GPS components, GIS components, and so on.

Figure 3:
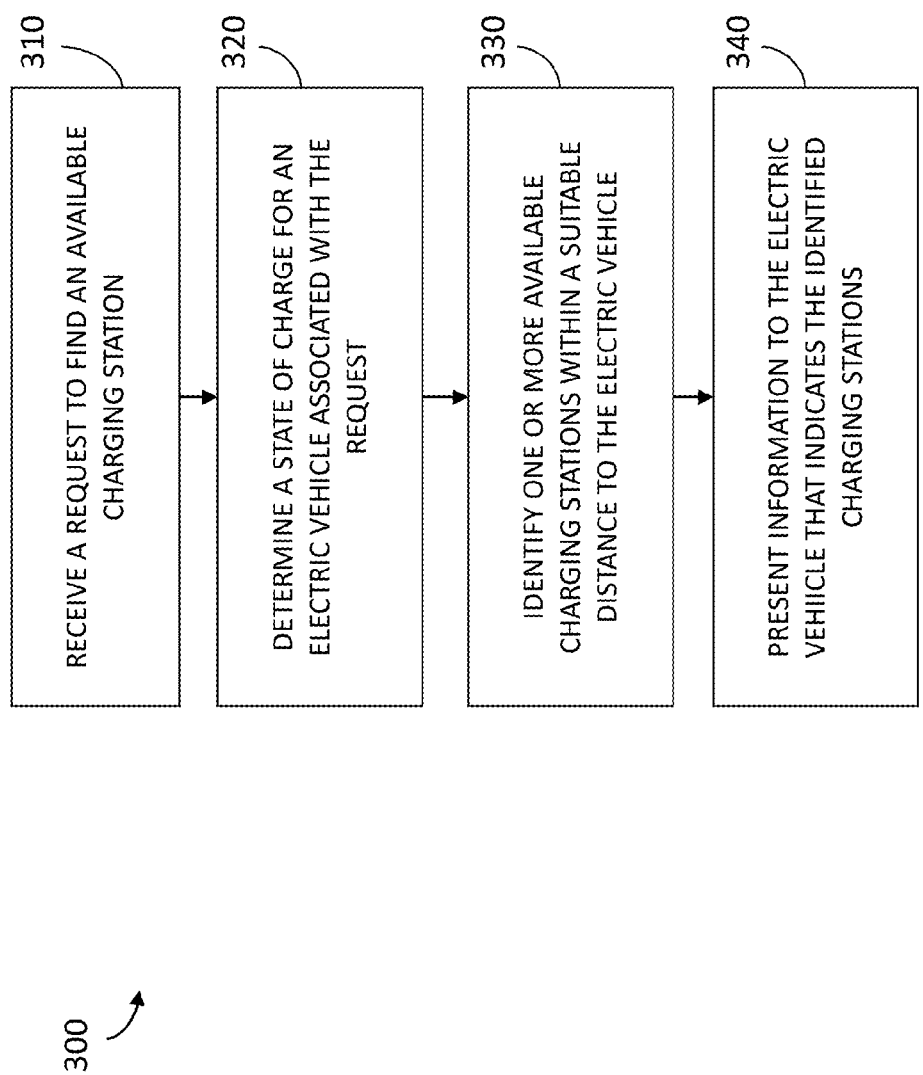
FIG. 3 is a flow diagram illustrating a method for presenting charging station information to a driver of an electric vehicle.

As described herein, in some embodiments, the vehicle routing system 125 performs methods and processes to determine charging stations that are suitable and available for an electric vehicle. FIG. 3 is a flow diagram illustrating a method 300 for presenting charging station information to a driver of an electric vehicle. The method 300 may be performed by the vehicle routing system 125 and, accordingly, is described herein merely by way of reference thereto. It will be appreciated that the method 300 may be performed on any suitable hardware.

In operation 310, the vehicle routing system 125 receives a request to find an available charging station. For example, the request module 210 may receive the request via input provided by a driver of the electric vehicle to the mobile application, may receive the request when the state of charge of the electric vehicle falls below a threshold state of charge, and so on.

In operation 320, the vehicle routing system 320 determines a state of charge for an electric vehicle associated with the request. For example, the charge state module 220 may query and/or access information stored by the computing device 135 in order to retrieve and/or access information indicating a state of charge of a battery pack of the electric vehicle 130.

In operation 330, the vehicle routing system 330 identifies one or more available charging stations located within a suitable distance to the electric vehicle, the suitable distance based on the determined state of the charge for the electric vehicle. For example, the station identification module 230 may identify a charging station as available when the charging station is not currently reserved by another electric vehicle, when the charging station is not currently charging another electric vehicle, by determining a travel time associated with the electric vehicle traveling to one or more prospective charging stations, and selecting or identifying prospective charging stations that are predicted to be available to charge the electric vehicle after the determined travel time has lapsed, and so on.

In operation 340, the vehicle routing system 340 presents information to the electric vehicle that indicates the identified charging stations. The display module 250 may display icons within a displayed map presented by a mapping application, the icons representative of the available charging stations, may present a list of information associated with the available charging stations, and so on. For example, the display module 250 may display, via a displayed map provided by a mapping application of a mobile device associated with the electric vehicle, a graphical element indicating a range of travel available to the electric vehicle based on the determined state of charge for the electric vehicle and icons representative of the available charging stations located within the range of travel available to the electric vehicle.

Figure 4A:
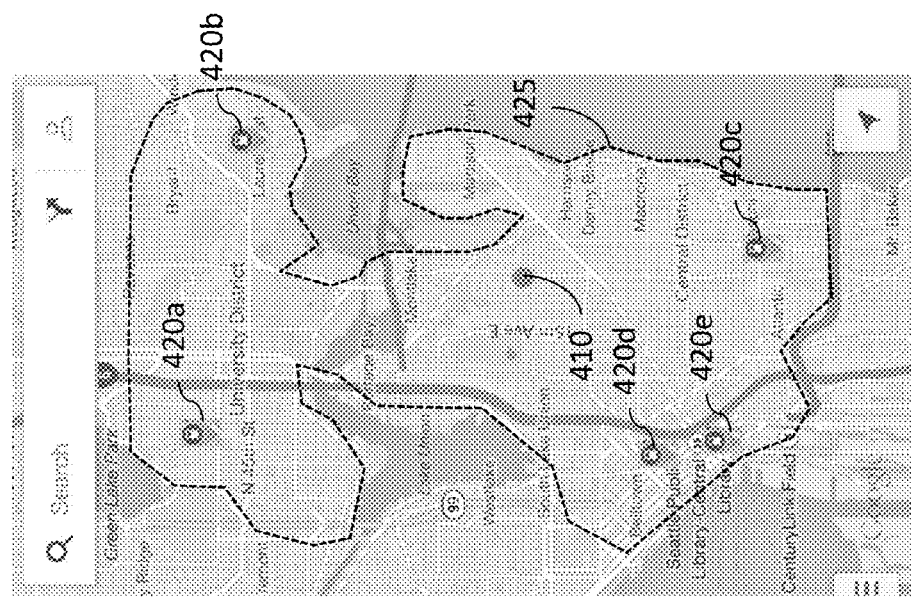
FIGS. 4A-4B are display diagrams illustrating example displays of charging station information.
Figure 4B:
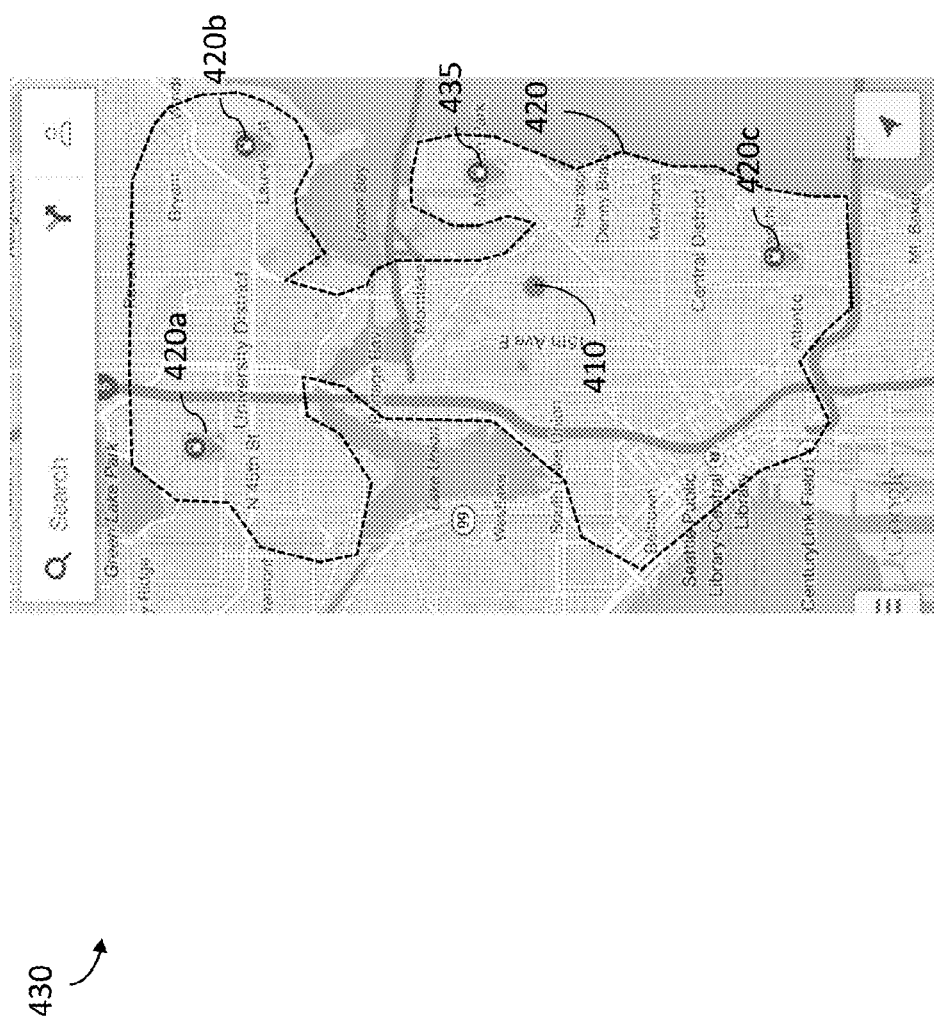

As an example, FIGS. 4A-4B depict example displays of charging station information, such as user interfaces displayed by a GPS of the electric vehicle 130 and/or displayed by the mobile application 127.

FIG. 4A shows a user interface that displays a map 400 surrounding a current location of an electric vehicle 410 at a given point in time. The map includes a graphical element 425 that indicates a range to which the electric vehicle 410 may travel based on a determined state of charge for the vehicle 410 along with icons representing available charging stations 420*a-e* for the electric vehicle 410. For example, the vehicle routing system 125 may perform method 300 and display the icons 420*a-e* to represent charging stations within a determined range of travel for the electric vehicle 410 that are determined to be available to charge the electric vehicle 410.

FIG. 4B shows a user interface that displays a map 430 surrounding a current location of an electric vehicle 410 at a later point in time. The map includes a graphical element 425 that indicates a range to which the electric vehicle 410 may travel based on a determined state of charge for the vehicle 410 along with icons representing charging stations 420*a-c* and 435 that are now available for the electric vehicle 410 at the later point in time. For example, the vehicle routing system 125 may perform method 300 and display the icons 420*a-c* and 435 to represent charging stations within a determined range of travel for the electric vehicle 410 that are determined to be available to charge the electric vehicle 410 at this later point in time.

Thus, in some embodiments, the vehicle routing system 125 may receive a request to find an available charging station determine a state of charge for an electric vehicle associated with the request, identify one or more available charging stations located within a suitable distance to the electric vehicle, the suitable distance based on the determined state of the charge for the electric vehicle, and display, via a displayed map provided by the mobile application 127 of the mobile device 110 associated with the electric vehicle 130, a graphical element indicating a range of travel available to the electric vehicle based on the determined state of charge for the electric vehicle and icons representative of the available charging stations located within the range of travel available to the electric vehicle.

Examples of Identifying Available Charging Stations for a Current Trip

As described herein, in some embodiments, the vehicle routing system 125 is configured to perform methods and processes to identify suitable charging stations for a current trip driven by an electric vehicle based on the context of the trip.

Figure 5:
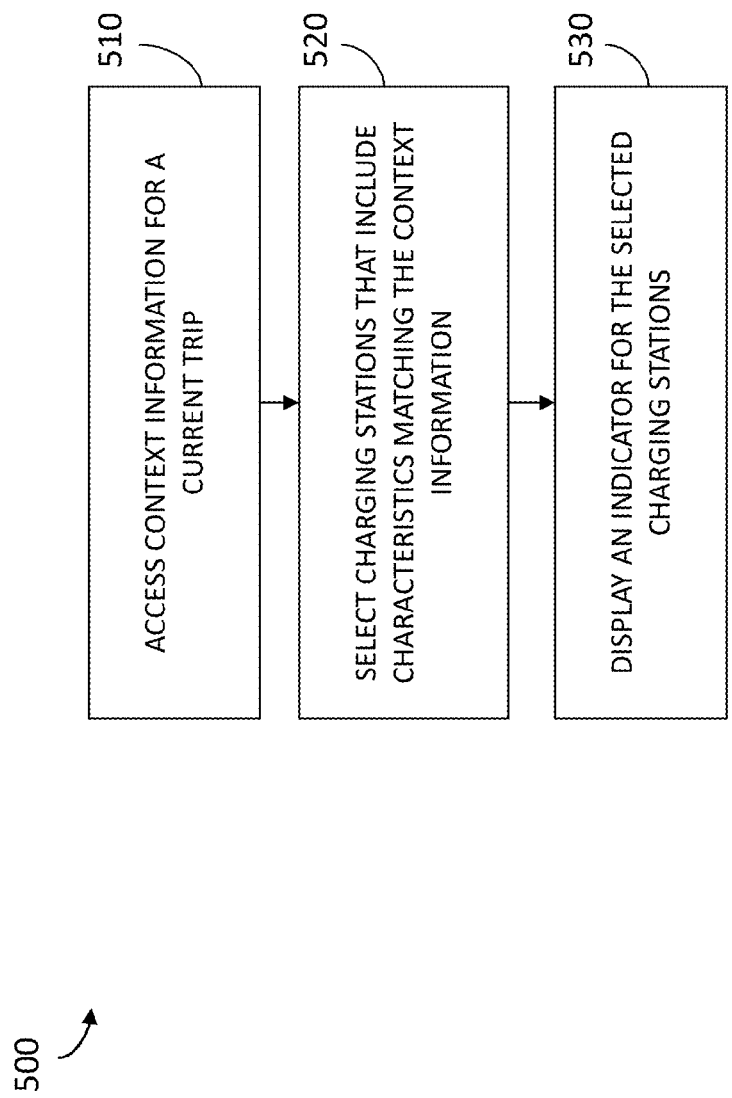
FIG. 5 is a flow diagram illustrating a method for presenting charging station information associated with a current trip driven by an electric vehicle.

FIG. 5 is a flow diagram illustrating a method 500 for presenting charging station information associated with a current trip driven by an electric vehicle. The method 500 may be performed by the vehicle routing system 125 and, accordingly, is described herein merely by way of reference thereto. It will be appreciated that the method 500 may be performed on any suitable hardware.

In operation 510, the vehicle routing system 125 receives a request to find a charging station. For example, the request module 210 may receive the request via input provided by a driver of the electric vehicle to the mobile application, may receive the request when the state of charge of the electric vehicle falls below a threshold state of charge, and so on.

In operation 520, the vehicle routing system 125 accesses context information for a current trip traveled by an electric vehicle associated with the request. For example, the trip context module 240 may access, retrieve, and/or receive context information provided by the computing device 135 of the electric vehicle 130 and/or provided by the mobile application 127, among other locations. The context information may include information associated with a current geographical route traveled by the electric vehicle, information associated with a geographical route predicted to be traveled by the electric vehicle, information indicating costs to charge at the one or more charging stations, information identifying charging networks providing the one or more charging stations, and so on.

In operation 530, the vehicle routing system 125 identifies one or more charging stations that include characteristics matching the context information. For example, the vehicle routing system 125 may identify at least one charging station that is located proximate to a current geographical route traveled by the electric vehicle, may identify at least one charging station that is located proximate to a current geographical route predicted to be traveled by the electric vehicle, may identify at least one charging station having an associated charging cost that is below a predetermined maximum cost to charge the electric vehicle, may identify at least one charging station that is provided by a charging network of which the electric vehicle is a member, and so on.

As another example, the station identification module 230 may identify a charging station as having characteristics matching the context information when the charging station is an available charging station, such as when the charging station is not currently reserved by another electric vehicle, when the charging station is not currently charging another electric vehicle, by determining a travel time associated with the electric vehicle traveling to one or more prospective charging stations, and selecting or identifying prospective charging stations that are predicted to be available to charge the electric vehicle after the determined travel time has lapsed, and so on.

In operation 540, the vehicle routing system 125 may present information to the electric vehicle that indicates the identified one or more charging stations. The display module 250 may display icons within a displayed map presented by a mapping application, the icons representative of the available charging stations, may present a list of information associated with the available charging stations, and so on. For example, the display module 250 may display, via a displayed map provided by a mapping application of a mobile device associated with the electric vehicle, a graphical element indicating a range of travel available to the electric vehicle based on the determined state of charge for the electric vehicle and icons representative of the available charging stations located within the range of travel available to the electric vehicle.

Thus, in some embodiments, the vehicle routing system 125 may identify charging stations that match a travel context associated with a current trip traveled by the electric vehicle 130, and present information to a driver of the electric vehicle 130 that represents the identified charging stations.

Examples of Automatically Selecting a Charging Station for an Electric Vehicle

As described herein, in some embodiments, the vehicle routing system 125 is configured to automatically select a charging station for an electric vehicle and/or for a current trip traveled by the electric vehicle, and present information associated with the selected charging station.

Figure 6:
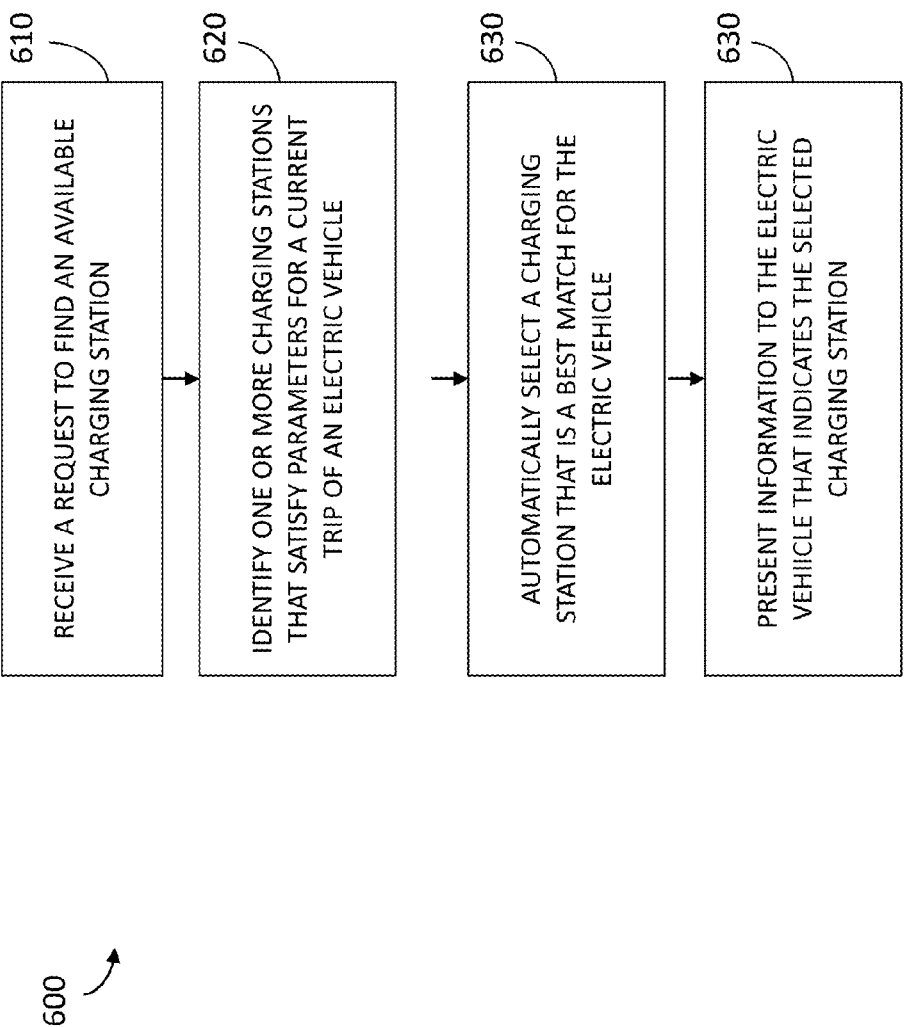
FIG. 6 is a flow diagram illustrating a method for presenting charging station information associated with a charging station automatically selected for an electric vehicle.

FIG. 6 is a flow diagram illustrating a method 600 for presenting charging station information associated with a charging station automatically selected for an electric vehicle. The method 600 may be performed by the vehicle routing system 125 and, accordingly, is described herein merely by way of reference thereto. It will be appreciated that the method 600 may be performed on any suitable hardware.

In operation 610, the vehicle routing system 125 receives a request to find an available charging station. For example, the request module 210 may receive the request via input provided by a driver of the electric vehicle to the mobile application, may receive the request when the state of charge of the electric vehicle falls below a threshold state of charge, and so on.

In operation 620, the vehicle routing system 125 identifies one or more charging stations that satisfy parameters for a current trip of an electric vehicle that is associated with the request. For example, the station identification module 230 may identify a charging station may satisfy parameters for a current trip of an electric vehicle when the charging station is not currently reserved by another electric vehicle, when the charging station is not currently charging another electric vehicle, by determining a travel time associated with the electric vehicle traveling to one or more prospective charging stations, and selecting or identifying prospective charging stations that are predicted to be available to charge the electric vehicle after the determined travel time has lapsed, and so on.

As another example, the station identification module 230 may identify a charging station that may satisfy parameters for a current trip of an electric vehicle when the station is located proximate to a current geographical route traveled by the electric vehicle, when the station is located proximate to a current geographical route predicted to be traveled by the electric vehicle, when the station has an associated charging cost that is below a predetermined maximum cost to charge the electric vehicle, when the station is provided by a charging network of which the electric vehicle is a member, and so on.

In operation 630, the vehicle routing system 125 automatically selects a charging station that is a best match for the electric vehicle. For example, the station selection module 260 may compare some or all available or proximate charging stations to information associated with the parameters of a current trip traveled by the electric vehicle 130, and determine a best matched charging station to the parameters of the current trip.

In operation 640, the vehicle routing system 125 presents information to the electric vehicle that indicates the selected charging station. The display module 250 may display icons within a displayed map presented by a mapping application, the icons representative of the available charging stations, may present a list of information associated with the available charging stations, and so on. For example, the display module 250 may display, via a displayed map provided by a mapping application of a mobile device associated with the electric vehicle, a graphical element indicating a range of travel available to the electric vehicle based on the determined state of charge for the electric vehicle and icons representative of the available charging stations located within the range of travel available to the electric vehicle.

In some embodiments, the vehicle routing system 125 may automatically reserve the selected charging station on behalf of the electric vehicle, may automatically authorize use of the selected charging station by the electric vehicle, may automatically provide payment for use of the selected charging station by the electric vehicle, and so on.

As described herein, in some embodiments, the vehicle routing system 125 may predict energy usage for various routes, and select charging stations based on the energy usage predictions. For example, the vehicle routing system 125 may receive a request from an electric vehicle to find an available charging station, determine a maximum energy usage for the electric vehicle, the maximum energy usage based on a current state of charge of a battery pack of the electric vehicle, identify a charging station located on a route having a predicted energy usage that is less than the identified maximum energy usage for the electric vehicle, and perform an action associated with charging the electric vehicle.

Examples of Determining a Driving Route for an Electric Vehicle

As described herein, in some embodiments, the vehicle routing system 125 is configured to determine a driving route for an electric vehicle and/or present the driving route to a driver of the electric vehicle.

Figure 7:
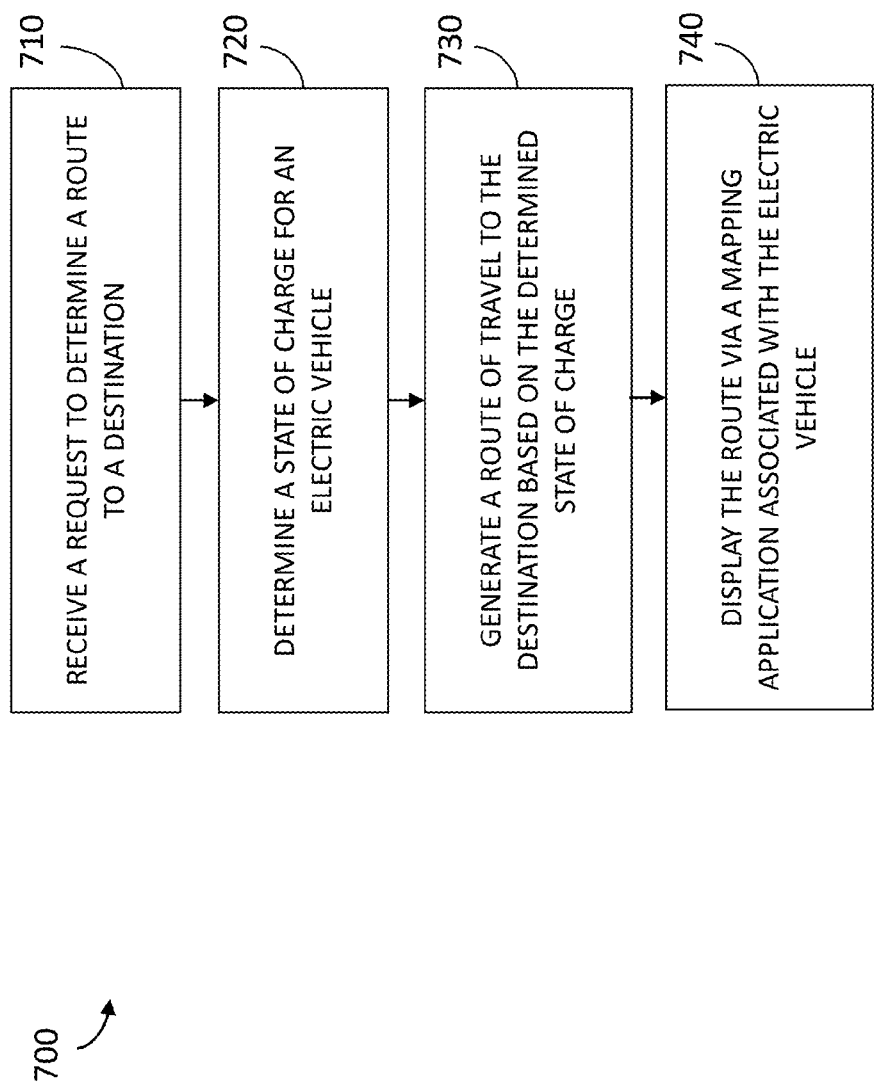
FIG. 7 is a flow diagram illustrating a method for generating driving directions for an electric vehicle.

FIG. 7 is a flow diagram illustrating a method 700 for generating driving directions for an electric vehicle. The method 700 may be performed by the vehicle routing system 125 and, accordingly, is described herein merely by way of reference thereto. It will be appreciated that the method 700 may be performed on any suitable hardware.

In operation 710, the vehicle routing system 125 receives a request to determine a route to a destination. For example, the request module 210 may receive the request via input provided by a driver of the electric vehicle to the mobile application, may receive the request when the state of charge of the electric vehicle falls below a threshold state of charge, and so on.

In operation 720, the vehicle routing system 125 determines a state of charge for an electric vehicle associated with the request. For example, the charge state module 220 may query and/or access information stored by the computing device 135 in order to retrieve and/or access information indicating a state of charge of a battery pack of the electric vehicle 130.

In operation 730, the vehicle routing system 125 generates a route of travel to the destination based on the determined state of charge. For example, the route generation module 270 may determine a possible driving distance for the electric vehicle based on a determined state of charge, and generate a route of travel that includes at least one charging station at a geographical location that is at a driving distance within the determined possible driving distance when a driving distance between a current location of the electric vehicle and the destination is greater than the determined possible driving distance for the electric vehicle based on the determined state of charge. The route generation module 270 may access information from various mapping applications and/or geographical positioning components, such as GPS components, GIS components, and so on.

In some embodiments, the route generation module 270 may generate a route of travel by determining a maximum energy usage associated with the determined state of charge, and generating a route of travel having a predicted energy usage that is less than the determined maximum energy usage for the state of the charge of the electric vehicle.

In operation 740, the vehicle routing system 125 displays the generated route via a mapping application associated with the electric vehicle. The display module 250 may display icons within a displayed map presented by a mapping application, the icons representative of the available charging stations, may present a list of information associated with the available charging stations, and so on. For example, the display module 250 may display, via a displayed map provided by a mapping application of a mobile device associated with the electric vehicle, a graphical element indicating a range of travel available to the electric vehicle based on the determined state of charge for the electric vehicle and icons representative of the available charging stations located within the range of travel available to the electric vehicle.

As described herein, the vehicle routing system 125 may consider energy usage when generating a route to a destination. For example, the vehicle routing system 125 may receive a request to determine a route to a destination, determine a state of charge for an electric vehicle associated with the request, determine a maximum energy usage associated with the determined state of charge, and generate a route to the destination having a predicted energy usage that is less than the determined maximum energy usage for the state of the charge of the electric vehicle.

Figure 8A:
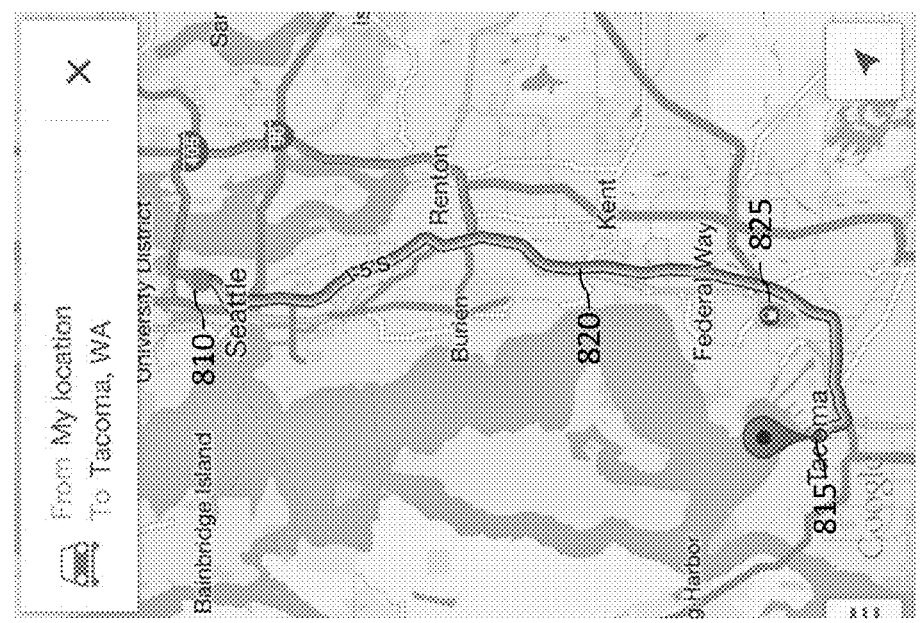
FIGS. 8A-8B are display diagrams illustrating example displays of driving routes determined for an electric vehicle.
Figure 8B:
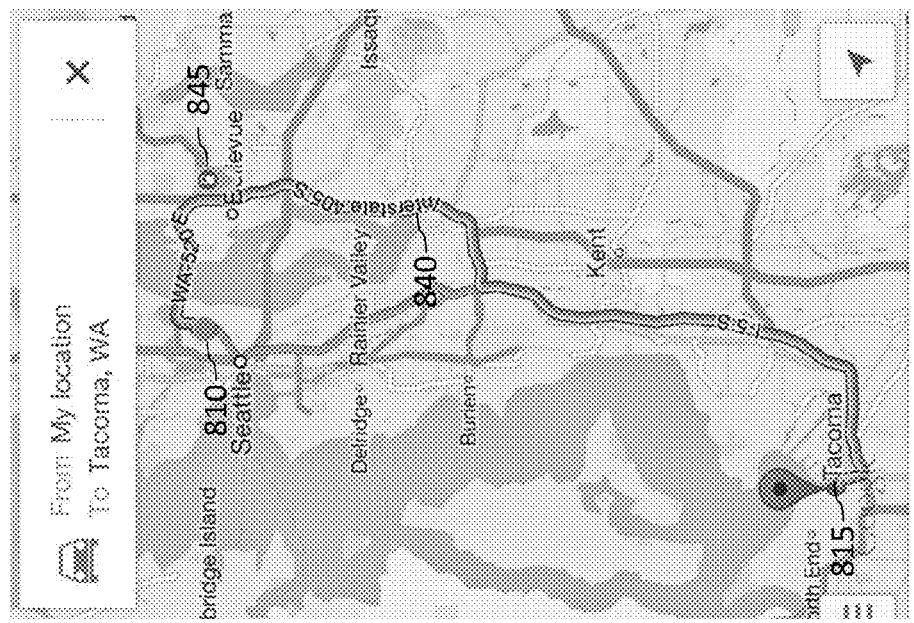

As an example, FIGS. 8A-8B depict example displays of driving routes determined for an electric vehicle. The vehicle routing system 125 may present the example displays via a mapping application supported by the mobile device 110 that is associated with the electric vehicle 130, via a user interface of a global positioning system associated with the electric vehicle 130, and so on.

FIG. 8A depicts a displayed map 800 that includes a starting location 810 of the electric vehicle 130 (e.g., a current location of an electric vehicle), a destination location 815, and a graphical representation 820 of a generated route for the electric vehicle 130 having a certain state of charge. FIG. 8B depicts a displayed map 830 that includes a starting location 810 of the electric vehicle 130 (e.g., a current location of an electric vehicle), a destination location 815, and a graphical representation 840 of a alternate generated route for the electric vehicle 130 having a different state of charge.

For example, the generated route shown in FIG. 8A includes an icon 825 that represents a charging station at a large distance away from the electric vehicle 810, while the generated route shown in FIG. 8B includes an icon 845 that represents a charging station at a short distance away from the electric vehicle 810. Thus, in some embodiments, the vehicle routing system 125 generates travel routes having varying configurations (e.g., different roads or highways, different charging stations) based on the state of charge, the predicted energy usage of the route (e.g., the predicted energy usage of a trip driven by the electric vehicle along the route) the availability of charging stations, and/or context associated with a current or predicted trip, among other things.

As described herein, in some embodiments, the vehicle routing system 125 may automatically reserve a charging station on behalf of the electric vehicle that is geographically positioned within or proximate to the generated route of travel, among other things.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system.

We claim:

1. A method, comprising:
   receiving a request to find an available charging station;
   determining a remaining available energy usage for an electric vehicle associated with the request,
      wherein the remaining available energy usage is based on a state of charge of a battery of the electric vehicle, a degradation status of the battery of the electric vehicle, a make of the electric vehicle, and an age of the electric vehicle;
   identifying one or more available charging stations located within a suitable distance to the electric vehicle, and on a route having an associated predicted energy usage that is less than the remaining available energy usage for the electric vehicle,
      wherein the predicted energy usage of the route is based on a distance to be traveled by the electric vehicle along the route, an elevation profile for the route, and current traffic along the route; and
   presenting information to the electric vehicle that indicates the identified one or more available charging stations.

2. The method of claim 1, wherein identifying one or more available charging stations located within a suitable distance to the electric vehicle includes identifying one or more available charging stations not currently reserved by another electric vehicle.

3. The method of claim 1, wherein identifying one or more available charging stations located within a suitable distance to the electric vehicle includes identifying one or more available charging stations not currently charging another electric vehicle.

4. The method of claim 1, wherein identifying one or more available charging stations located within a suitable distance to the electric vehicle includes:
   determining a travel time associated with the electric vehicle traveling to one or more prospective charging stations; and
   selecting prospective charging stations that are predicted to be available to charge the electric vehicle after the determined travel time has lapsed.

5. The method of claim 1, wherein presenting information to the electric vehicle that indicates the identified charging stations includes displaying icons within a displayed map presented by a mapping application, the icons representative of the available charging stations.

6. The method of claim 1, wherein presenting information to the electric vehicle that indicates the identified charging stations includes presenting a list of information associated with the available charging stations.

7. The method of claim 1, wherein presenting information to the electric vehicle that indicates the identified charging stations includes displaying, via a displayed map provided by a mapping application of a mobile device associated with the electric vehicle, a graphical element indicating a range of travel available to the electric vehicle based on the determined state of charge for the electric vehicle and icons representative of the available charging stations located within the range of travel available to the electric vehicle.

8. A non-transitory computer-readable storage medium whose contents, when executed by a mobile application supported by a mobile device, cause the mobile application to perform operations, comprising:
   receiving a request to find an available charging station;
   determining a state of charge for an electric vehicle associated with the request;
   identifying one or more available charging stations that are located:
      within a suitable distance to the electric vehicle, the suitable distance based on the determined state of the charge for the electric vehicle, and
      on a route having an associated predicted energy usage that matches the determined state of charge of the electric vehicle,
         wherein the associated predicted energy usage for the route is based on a distance traveled by the electric vehicle along the route, an elevation profile for the route, and current traffic along the route; and
   displaying, via a displayed map provided by a mapping application of a mobile device associated with the electric vehicle, a graphical element indicating a range of travel available to the electric vehicle based on the determined state of charge for the electric vehicle and icons representative of the one or more available charging stations located within the range of travel available to the electric vehicle.

9. The computer-readable storage medium of claim 8, wherein receiving a request to find an available charging station includes receiving the request via input provided by a driver of the electric vehicle to the mobile application.

10. The computer-readable storage medium of claim 8, wherein receiving a request to find an available charging station includes automatically receiving the request when the state of charge of the electric vehicle falls below a threshold state of charge.

11. The computer-readable storage medium of claim 8, wherein the associated predicted energy usage for the route is based on a make of the electric vehicle traveling along the route and an age of the electric vehicle.

12. A method, comprising:
   receiving a request to find an available charging station;
   determining a state of charge for an electric vehicle associated with the request;
   identifying one or more available charging stations that are located:
      within a suitable distance to the electric vehicle, the suitable distance based on the determined state of the charge for the electric vehicle, and
      on a route having an associated predicted energy usage that matches the determined state of charge of the electric vehicle,
         wherein the associated predicted energy usage for the route is based on a distance to be traveled by the electric vehicle along the route, a make of the electric vehicle traveling along the route, and an age of the electric vehicle; and
   displaying, via a displayed map provided by a mapping application of a mobile device associated with the electric vehicle, a graphical element indicating a range of travel available to the electric vehicle based on the determined state of charge for the electric vehicle and icons representative of the one or more available charging stations located within the range of travel available to the electric vehicle.

13. The method of claim 12, wherein receiving a request to find an available charging station includes receiving the request via input provided by a driver of the electric vehicle to the mapping application.

14. The method of claim 12, wherein receiving a request to find an available charging station includes automatically receiving the request when the state of charge of the electric vehicle falls below a threshold state of charge.

15. The method of claim 12, wherein the associated predicted energy usage for the route is also based on an elevation profile for the route.

16. The method of claim 12, wherein the associated predicted energy usage for the route is also based on current traffic along the route.

\* \* \* \* \*